United States Patent

[11] 3,550,928

[72] Inventor Werner Antritter
 Villingen, Germany
[21] Appl. No. 774,444
[22] Filed Nov. 8, 1968
[45] Patented Dec. 29, 1970
[73] Assignee Kienzle Apparate G.m.b.H.
 Villingen, Black Forest, Germany
[32] Priority Nov. 9, 1967
[33] Germany
[31] No. 1,623,756

[54] COIL SPRING
 10 Claims, 2 Drawing Figs.
[52] U.S. Cl. .................................................. 267/156
[51] Int. Cl. .................................................. F16f 1/10
[50] Field of Search ........................................... 267/167,
 179, 155, 156, 157, 62, 61

[56] References Cited
UNITED STATES PATENTS
2,937,866  5/1960  Rogerson ..................... 267/1(56)
FOREIGN PATENTS
740,615  11/1955  Great Britain ................ 267/1(56)

Primary Examiner—James B. Marbert
Attorney—Michael S. Striker

ABSTRACT: A coil spring, particularly for use in measuring devices, has an active body portion the inner end of which is to be connected rigidly with a rotatable member, and a radially outer end. An extension is connected with the outer end, or may be integral therewith, and extends from this outer end circumferentially of the spring to form a partial convolution. The free end of this extension is rigid with an abutment. The extension has greater bending resistance than the coil spring.

3,550,928

INVENTOR

Werner Antritter

COIL SPRING

BACKGROUND OF THE INVENTION

The present invention relates to a special type of coil spring, and more particularly to a coil spring for use in measuring and indicating instruments. Still more particularly, the invention relates to a coil spring for use in measuring and indicating instruments wherein the inner end of the coil spring is connected with a turnable member of the instrument whereas the outer end of the coil spring is to be radially movable.

In measuring and indicating instruments, it is generally customary to compare the measured value which is transformed to a torque, with a countertorque produced by a spiral spring. A difficulty arises in such instances because of the nonsymmetrical contraction of such springs, also known as "breathing." This phenomenon, which occurs where the inner end of a coil spring is connected with a turnable member such as a shaft while the outer end is immovably connected with an abutment, such as the housing, the immovably retained outer end of the coil spring cannot move in radially inward direction when the spring undergoes contraction, as is the case with the inner convolutions of the spring. As a result of this, the actual center of the spring keeps moving farther away from the turnable member as contraction of the spring progresses. This, in turn, results in eccentric positioning of the spring with respect to the turnable member and in development of an additional torque which acts upon the turnable member, thereby causing additional bearing friction and changing the characteristic line Other problems which occur in this connection include the fact that, especially in springs having a great number of convolutions, the convoluted portions of the spring which are substantially opposite the point where the outer end of the spring is immovably secured, will contact one another and produce an additional friction torque. Also, in spiral springs which are to be operative through a relatively large angle of rotation, the number of convolutions must be as small as possible in order to assure that, taking into account the available space dictated by the remainder of the device in which the spring is to be used, the convolutions of the spring will be sufficiently spaced from one another. In such circumstances, the spring has a strong tendency to nonsymmetrical "breathing."

Attempts have been made in balance regulators of time pieces where high accuracy is required, to overcome the problems of nonsymmetrical breathing or development of spiral springs. This involves the use of the so-called Brequet-coil wherein the outermost end portion of the spring is bent out of the plane of the spring and reverts back to the movable shaft of the balance in a second plane. However, this is an expensive proposition and such a construction additionally requires increased space availability. For this reason, this approach can be used only in time pieces for which a high accuracy is required, because only there is it only economically justifiable.

Another proposal which has been made is to bend the outer free end portion of the coil spring so that it extends at a right angle in the plane of the spring, and to guide this angled portion in a slot. While this would permit radial movement of the outermost end of the spring, such movement is conditioned upon the bending moment resulting on contraction of the spring, and the friction which develops between the guide slot and the spring portion guided in the slot prevents smooth movement of the outer free spring end portion. Thus, such radial movement is not smooth but rather jerky and results in an inaccurate nonreproducible indication, aside from the fact that the eccentric development or breathing of the spring is not entirely eliminated by this measure.

It is, accordingly, an object of the present invention to overcome the aforementioned disadvantages.

SUMMARY OF THE INVENTION

In accordance with one feature of my invention I provide, in a structure outlined before, wherein a coil spring has an active body portion including an inner end rigid with a rotatable member and a radially outer end, for means associated with the radially outer end of the coil spring which means is operative for the purpose of permitting continuous smooth radial movement of the outer end.

This means may be a one-piece extension in circumferential direction of the outer free end of the coil spring, or it may be in form of a separate portion which is rigidly connected with the outer free end of the coil spring. The term outer free end is to be understood as the outer free end of the active body portion of the coil spring, and is that end which is desired to be provided with freedom of radial movement thereby issue a symmetrical development or "breathing" of the spiral spring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
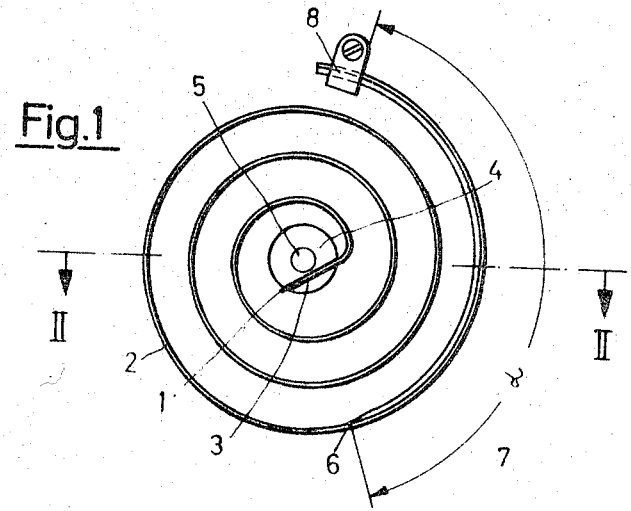
FIG. 1 is a diagrammatic top-plan view of an arrangement incorporating my invention.

Discussing now the drawing in detail, it will be seen that the radially inner end 1 of the spiral spring or coil spring 2 is secured to a movable member, here identified as a sleeve or bushing 4 into a slot free of which the inner end 1 of the spring 2 is pressed or otherwise secured. The sleeve 4 is connected via the bore 5 with the nonillustrated turnable shaft of the measuring device on which it is mounted.

The spring 2 has an active body portion extending from the inner end 1 to approximately the point 6 which constitutes the outer free end of the coil spring 2.

In accordance with my invention, I provide means enabling radial movement of the outer free end of the spring 2, that is the portion located in the region of the point 6, and this means is in form of an extension 7 constituting a partial convolution of the coil spring and extending from the outer free end of the active body portion, that is from the point 6, circumferentially of the coil spring. In the illustrated embodiment, the convolution described by the portion 7 is an angle $\alpha$ of approximately 180° and the outer or terminal end of the portion 7 is restrained against any movement via the abutment 8.

Figure 2:
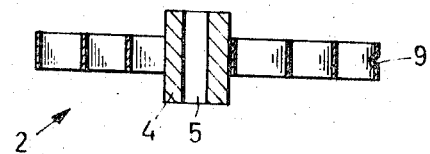
FIG. 2 is a section taken on the line II–II of FIG. 1.

In the illustrated embodiment of the portion 7 is provided with a bead 9 shown in FIG. 2. It extends longitudinally of the portion 7 and may in simplest manner be provided by forming a groove or depression in one side and a corresponding rib in the other side of the portion 7, as illustrated in FIG. 2.

Another purpose is, of course, to give the portion 7 a bending movement that is a resistance to bending, which is greater than that of the active portion of the spring 2 with the result that, when upon contraction of the spring 2 the outer free end of the active portion in the region of the point 6 tends to move radially outwardly, it can do so smoothly against the resistance of the portion 7 which it is capable of deflecting in radially outward direction. The bead 9 is advantageously so constructed that it will taper into the active body portion of the spring 2 gradually, to assure the gradual and even distribution of the bending moment occurring in the region of the point 6 to the portion 7.

It will be understood that each of the elements described above, or two or more together, may also find a useful application in other types of constructions differing from the types described above.

While the invention has been illustrated and described as embodied in a coil spring, it is not intended to be limited to the details shown, since various modifications and structural changes may be made without departing in any way from the spirit of the present invention.

I claim:

1. In a measuring device having a shaft freely rotatable to and from a rest position, a coil restoring spring having an active body portion including a plurality of convolutions all of which are out of contact with one another, an inner end rigid with said rotatable shaft, and a radially outer end; and means associated with said radially outer end and operative for permitting continuous smooth radially inward and radially outward movement of said outer end in response to changes in the contractile status of the spring resulting from rotation of said shaft to or from said rest position.

2. In a device as defined in claim 1 wherein said means includes an elastic portion constituting a continuation in circumferential direction of said outer end of said coil spring, said portion having a free end, and said means further including an abutment maintaining said free end against movement.

3. In a device as defined in claim 2, said elastic portion having a bending resistance greater than that of said coil spring.

4. In a device as defined in claim 3, said elastic portion having such a length in circumferential direction of said coil spring as to constitute in part the outermost convolution thereof.

5. In a device as defined in claim 3, said elastic portion being provided with a reinforcement for increasing the bending resistance thereof in the plane of said spring.

6. In a device as defined in claim 5, said reinforcement being a bead extending longitudinally of said elastic portion.

7. In a device as defined in claim 3, said elastic portion being of one piece with the remainder of said spring.

8. In a device as defined in claim 3, said elastic portion tapering gradually into said outer free end of said coil spring.

9. In a device as defined in claim 3, said elastic portion extending intermediate said outer free end and said abutment over substantially 180° of arc.

10. In a device as defined in claim 3, said spring consisting of metallic material.